United States Patent [19]

Hegg et al.

[11] Patent Number: 5,694,014
[45] Date of Patent: Dec. 2, 1997

[54] ACTIVE HAND CONTROLLER REDUNDANCY AND ARCHITECTURE

[75] Inventors: Jeffrey W. Hegg, N. Reddington Beach, Fla.; Larry J. Yount, Scottsdale; William F. Potter, Glendale, both of Ariz.

[73] Assignee: Honeywell Inc., Minneapolis, Minn.

[21] Appl. No.: 518,052

[22] Filed: Aug. 22, 1995

[51] Int. Cl.$^6$ .................................................. G05B 11/01
[52] U.S. Cl. ........................... 318/564; 318/584; 318/628; 244/223; 244/228; 244/229
[58] Field of Search ....................... 318/1, 2, 561, 318/562, 563, 564, 568.1, 575, 584, 590, 625, 628, 632, 565, 566; 74/471 XY; 244/220, 221, 223, 228, 229

[56] References Cited

U.S. PATENT DOCUMENTS

| | | |
|---|---|---|
| 4,150,803 | 4/1979 | Fernandez . |
| 4,580,210 | 4/1986 | Nordstrom . |
| 4,895,039 | 1/1990 | Hegg . |
| 4,947,701 | 8/1990 | Hegg . |
| 5,264,768 | 11/1993 | Gregory et al. ........................ 318/561 |
| 5,291,113 | 3/1994 | Hegg et al. ........................ 318/584 |
| 5,347,204 | 9/1994 | Gregory et al. ........................ 318/632 |
| 5,412,299 | 5/1995 | Gregory et al. ........................ 318/628 |
| 5,456,428 | 10/1995 | Hegg ........................................ 244/229 |
| 5,473,235 | 12/1995 | Hegg et al. . |

*Primary Examiner*—Bentsu Ro
*Attorney, Agent, or Firm*—Thomas A. Rendos

[57] ABSTRACT

A hand controller system which provides the proper feel of the hand controller during aircraft operation. In both non-redundant and redundant embodiments, torque, and position measurements are made from the hand controller movements and processed to provide a feedback to a control motor in mechanical connection with the hand controller. The system includes self-monitoring of the motor, as well as the signals provided by the position, and torque sensors. Connections are provided from the hand controller system so that cross-coupling may be provided between the pilot's and copilot's hand controllers.

23 Claims, 8 Drawing Sheets

ACTIVE HAND CONTROLLER REDUNDANCY AND ARCHITECTURE

FIELD OF THE INVENTION

The present invention relates to control systems wherein manual control devices such as hand controllers are provided with an electrically-simulated variable feel. In particular, the invention relates to redundancy of the hand controllers and architecture for use of such hand controllers.

BACKGROUND OF THE INVENTION

The types of hand controllers to which the present invention is directed generally are disclosed in U.S. Pat. No. 5,264,768 to Gregory, et al., and entitled "Active Hand Controller Feedback Loop." The hand controllers generally involve the use of a control stick actuable in at least two perpendicular planes to provide both vertical and lateral control of the device being controlled. The hand controllers may be movable in three rotational or three translational axis with up to six axis degrees of freedom. A position transducer is associated with the control stick and is used to generate output signals which command a control actuator to effect control of the device being controlled. The output from the transducer is fed through a feel servo system with at least one servo motor, which is mechanically coupled to a control stick at its axis. The servo motor either applies a resisting force on the control stick, or in response to a signal produced by sensors that detect forces applied to the device or surface being controlled, drives the stick and in turn, drives the device being controlled to alleviate forces generated by the device under control. The active hand controller of U.S. Pat. No. 5,264,768, utilizes a rate detector for generating a rate signal, a position detector for generating a position signal indicative of the position of the control stick and a force detector for detecting the force exerted on the control stick by the user. Control electronics receive the signals generated and transmit a control signal which is applied to a motor which exerts a force on the control stick in order to accomplish electro-simulated variable feel for the system.

In operation, the devices as used in the cockpit of aircraft are typically designed to exhibit some desired force versus displacement characteristics to the user whereby the magnitude of the control stick displacement is proportional to force supplied. The pilot controller produces as its output an electrical signal corresponding to the control stick position, and the signal is used to control the aircraft through the action of various motors and mechanical means in a manner which is well known to those of ordinary skill in the art. Thus, in use such systems provide an electronically controlled manual input control stick having force feel characteristics like those of purely mechanical linked systems. Such electrically controlled system involve applications which are typically referred to as "fly by wire" applications.

It is desirable on an aircraft to couple two control sticks together to ensure that they track each other and that only a single set of command signals are provided to the aircraft. For example, a copilot sidestick and a pilot sidestick track each other and output command signals to the control surfaces and engines. In the past, such aircraft pilot control sticks had been coupled between pilot and copilot seats by mechanical means such as linkages, shafts, hydraulic devices and other complicated, bulky and weighty mechanisms. The recent efforts to save on the weight of these mechanical coupling systems have provided the "fly by wire" applications which employ no means of coupling the motions of the pilot and copilot control sticks. This approach has the disadvantage of requiring that some means of averaging or arbitrating between the differing command signals, in the event that the pilots and copilots at the same instant move the sidesticks in opposite directions. As shown in U.S. Pat. No. 5,291,113 to Hegg, et al., which is entitled "Servo Coupled Hand Controllers" provides for servo-coupling the pilot and copilot sidesticks. Each sidestick is capable of generating control signals in response to a manual input on the sidestick from the movement of the sidestick caused by a pilot or copilot. One of the sidesticks is the lead controller and the other sidestick is a following control stick. For example, the lead device is used by the pilot and the following sidestick is used by the copilot. Such coupling allows the sidesticks to mirror each others movements. As such, the pilot and copilot can feel each others influence on the control of the aircraft.

The U.S. Pat. No. 5,291,113 is hereby incorporated by reference.

The features provided by the servo motor driven control sticks include cross cockpit coupling autopilot backdrive, variable feel system and flight envelop limiting. In accordance with Federal Air Regulations and in order to provide safe control of an aircraft throughout the regimes in which a flight control system of the aircraft is utilized, constraints are put on flight control systems including hand controller systems utilized therein. Any failure condition which prevents continued safe flight and landing must be extremely improbable. Present regulations require very low probability of failure per hour for flight critical components. Hand controller systems are flight critical portions of a flight control system in which the failure of endangers the lives of persons aboard the aircraft. Generally, the safety levels and components of the system are determined by aircraft level analysis, known to those skilled in the art. Analysis of non-critical flight control system elements, however, typically are performed on a much lesser probability level of failures per hour than flight critical portions. For example, components of a flight control system including a hand controller system utilized in landing aircraft may be designated to be flight critical, whereas certain components utilized during cruise control may be designated as non-critical. With the development of active sidesticks for fly by wire aircraft, a need for providing such hand controller systems in conjunction with reliable and fault tolerant flight control systems has arisen. Prior architecture implementations have been achieved with a passive sidestick, but are not applicable to the new active sidestick technology as discussed above. Therefore, the need has arisen for the integration of redundant active sidesticks for fly by wire aircraft into aircraft avionics system flight computer architectures.

SUMMARY OF THE INVENTION

A hand controller system is disclosed which incorporates redundant self-monitoring and integrates a pilot's and copilot's hand controller into the aircraft's flight control system architecture. A non-redundant hand controller system includes a manual controller in which the control commands are input by the pilot. A motor is in mechanical connection with the manual controller. Position, and torque sensors monitor the movements of the manual controller and provide input signals to a feel generator. The feel generator provides a feedback signal to the motor which in turn provides the proper "feel" for the hand controller. The hand controller system also include means for self-monitoring the motor signal, the position signal and the torque signal. The method for controlling motors is consistent with motor control methodology used in existing aircraft.

The hand controller may include a pair of digital controllers including software or firmware for implementing various functions such as self-monitoring. Each digital controller receives the position and torque signals while the first digital controller act as a command controller and provides a feedback signal to the motor to provide the feel characteristics. The second digital controller acts to monitor the command controller, and also provides feedback signals to the motor. Both digital controllers must be functional for the motor to produce torque. The digital controllers are also provided with connections with the aircraft systems so that cross-coupling may occur between the pilot's and copilot's hand controllers and autopilot backdrive is achieved.

In another embodiment of the invention, the hand controller system includes a redundant channel identical to the one described above. Both channels include the motor, multiple sensors, and feel generators. The redundant motors both mechanically connect to the gearhead of the hand controller. Both channels are continuously operational to provide the proper "feel" for the hand controller. Both channels may also comprise digital controllers which process the sensor signals as well as provide the feedback signal. Connections are also provided for both channels to provide cross-cockpit coupling and autopilot backdrive. Also, architecture of the invention when integrated with the aircraft flight control system for both non-redundant and redundant implementation are provided.

DESCRIPTION OF THE PREFERRED EMBODIMENTS

Figure 1:
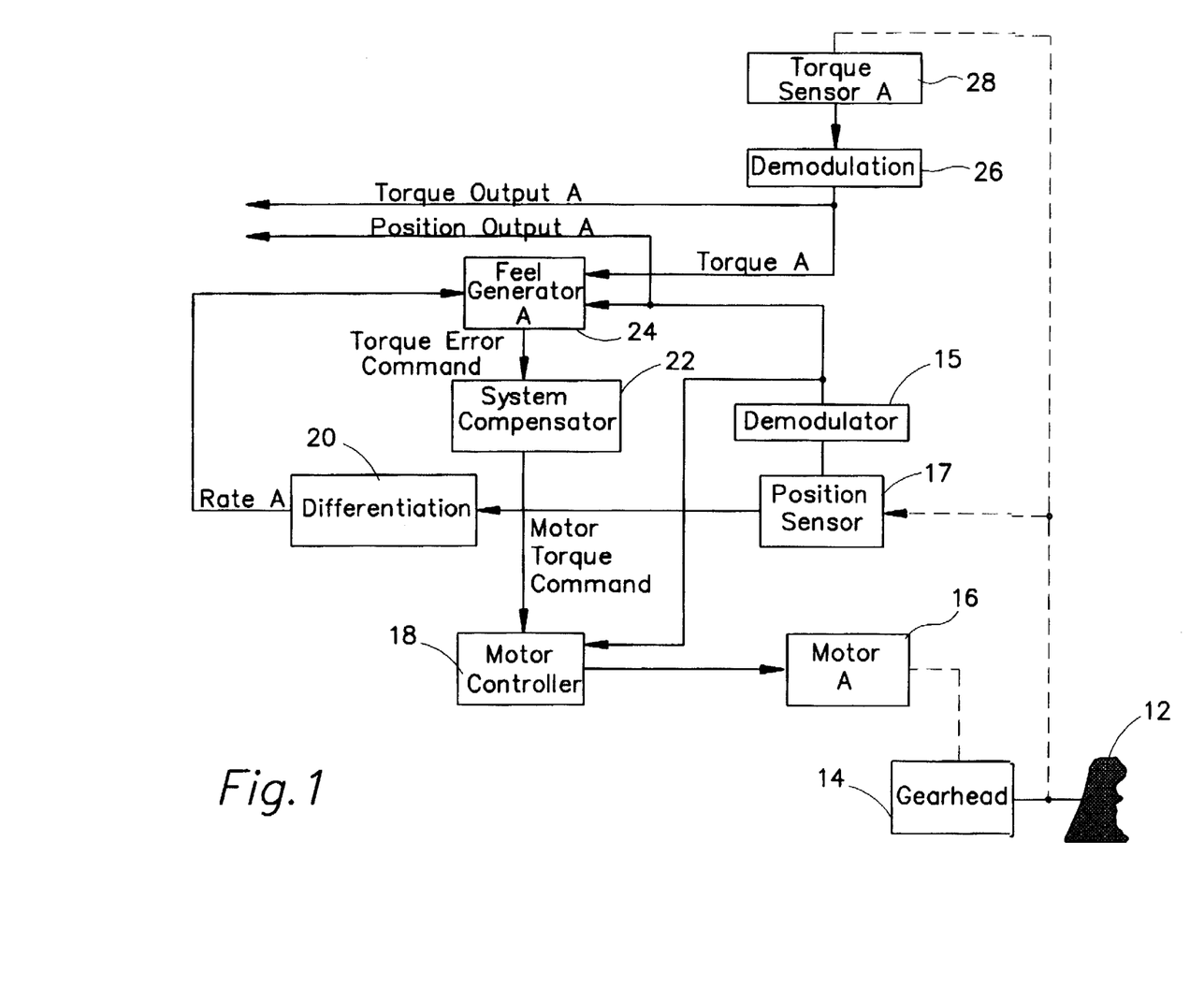
FIG. 1 is a block diagram of the feel system servo elements in a non-redundant active hand controller.

Shown in FIG. 1 is a preferred embodiment of the feel system in a non-redundant hand controller servo loop. Shown is one hand controller non-redundant servo loop arrangement. This arrangement incorporates self-monitoring failure detection methods described in FIGS. 2, 3 and 4. The overall system includes both pilot and copilot hand controllers as well as the interconnections between the hand controller systems and the aircraft's flight control system.

The hand grip 12 is connected to gearhead 14 typically through some form of gimbal arrangement (not shown). Gearhead 14 is physically connected to a common motor shaft illustrated in FIG. 1 by a dash line. Torque sensor 28 and position sensor 17 are physically connected to a gimbal arrangement between the grip and gearhead (not shown).

Motor controller 18 accepts a motor torque command from the system compensator 22 and a position signal from position sensor 17 and demodulator 15. The motor controller 18 provides a drive signal to motor 16. The position sensor 17 outputs a signal to demodulator 15 which provides a position signal output as well as a rate signal via differentiator 20. The torque signal from torque sensor 28 is provided to demodulator 26 which provides a torque signal output. The position signal is output from the hand controller either before or after the demodulator to provide a signal to the fly by wire flight control system. The torque output signal is provided for cross-cockpit coupling of the pilot and copilot hand controllers.

Feel generator 24 accepts a position signal, rate signal and torque signal. Feel generator provides a torque error command signal to the system compensator 22. The system compensator 22 then transmits a motor torque command signal to motor controller 18. The position sensor 17 and demodulator 15 output signal is used by the motor controller 18 to commutate the signals to motor A 16. The feel generators determine the feel of hand grip 12 to an operator so that the desired force vs. displacement characteristic of hand controller 12 is felt by the operator. The elements of FIG. 1 can be implemented with digital or analog circuitry.

In order to provide self monitoring of the feel system servo loop disclosed in FIG. 1, a number of built in tests must be performed. These tests monitor the torque signal, and position signals, the power supplies, the motor and motor drivers. Self monitoring of a non-redundant system provides an architecture which is single fail safe for the active hand controller. These built in tests which can be performed alone or in conjunction with each other, are described further in FIGS. 2–4 below.

Figure 2:
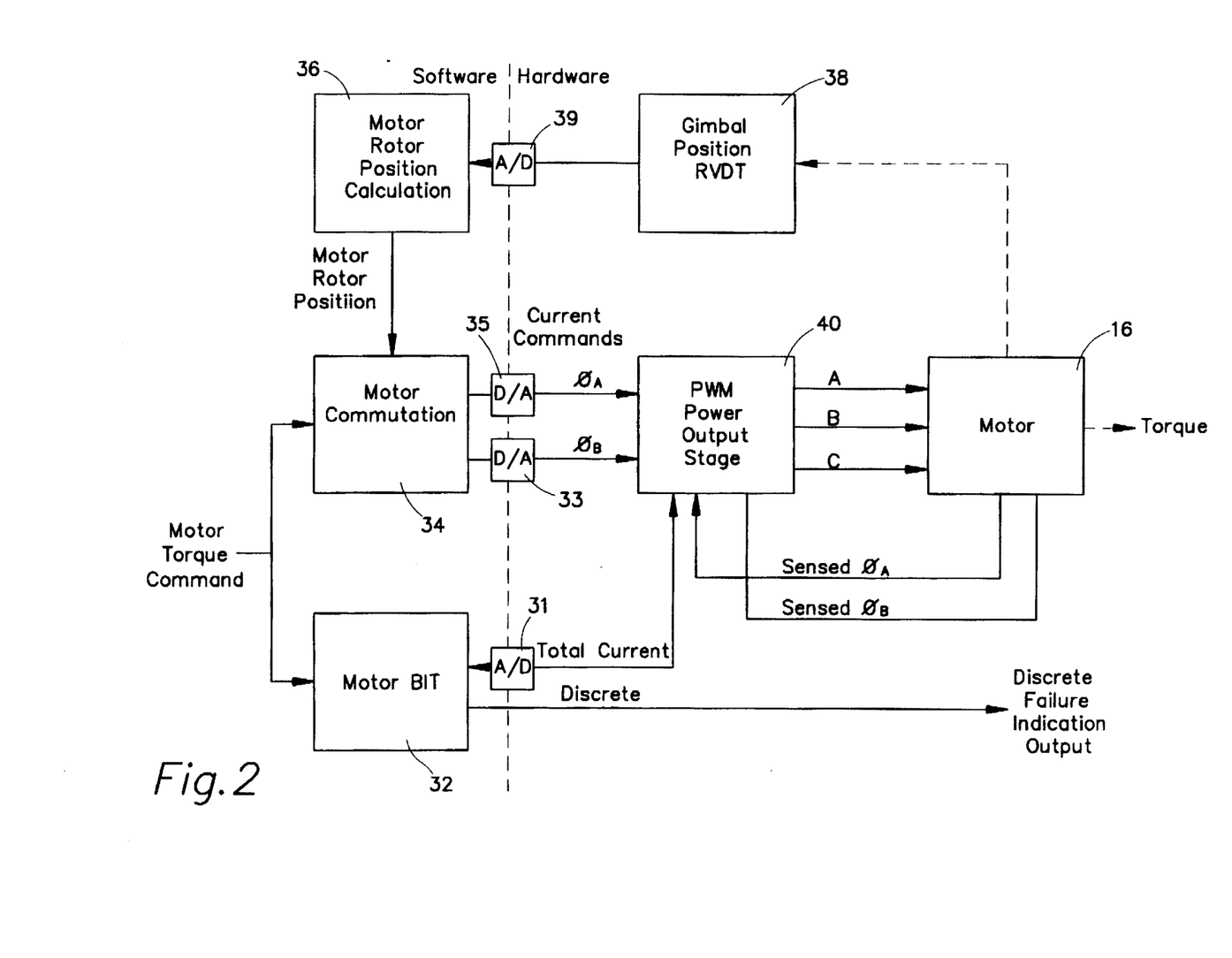
FIG. 2 is a block diagram of self monitoring for the motor and motor controller.

FIG. 2 illustrates self-monitoring method where the motor torque command is compared with the motor current. There is a fixed relationship between motor torque command and current to the motor 16. By comparing the actual values in real time, self-monitoring is achieved for all the elements involved to generate the current to the motor in response to the motor command. The motor torque command shown in FIG. 2 controls the forces on the grip. The motor torque command is applied to the motor commutation 34 which determines current commands of the individual motor windings phase A, $\phi_A$, and Phase B, $\phi_B$. These current commands are applied via D/A's 35 and 33 for a digital system implementation to the pulse width modulator (PWM) output stage 40 which generates specific pulsed voltage commands A, B and C to the three phase motor 16. $\phi_A$ and $\phi_B$ currents are sensed and fed back to the PWM output stage 40 for closed loop tracking of the current commands. The total current being dram by all phases of the motor is measured in the PWM power output stage 40 and delivered to the motor built in test 32 function via A/D 31 which compares the measured total current with the motor torque command to determine if failure has occurred in any of the elements. The motor commutation requires information about the motor rotor position relative to the motor stator. This information is determined by the mechanical connection between motor rotor position and gimbal position 38 as measured by a rotary variable differential transformer RVDT. The voltage of the demodulated RVDT gimbal position is applied via A/D 39 to the motor rotor position calculation 36, performed either digitally or with analog circuitry to provide a voltage or digital representation of the motor rotor position to the motor commutator 34. Hence, the gimbal position RVDT 38, resolver motor rotor position calculation element 36, motor commutation 34, Pulse Width Modulation (PWM) output stage 40, and the motor 16 are all monitored using the comparison between motor torque command and motor current.

Self monitoring is also included for the internal power supplies. The output voltages are input to monitoring circuits which compare the power supply to preset limits to determine whether the power is within specification limits. This self-monitoring method for power supplies is well known in the prior art and not shown in detail.

Figure 3:
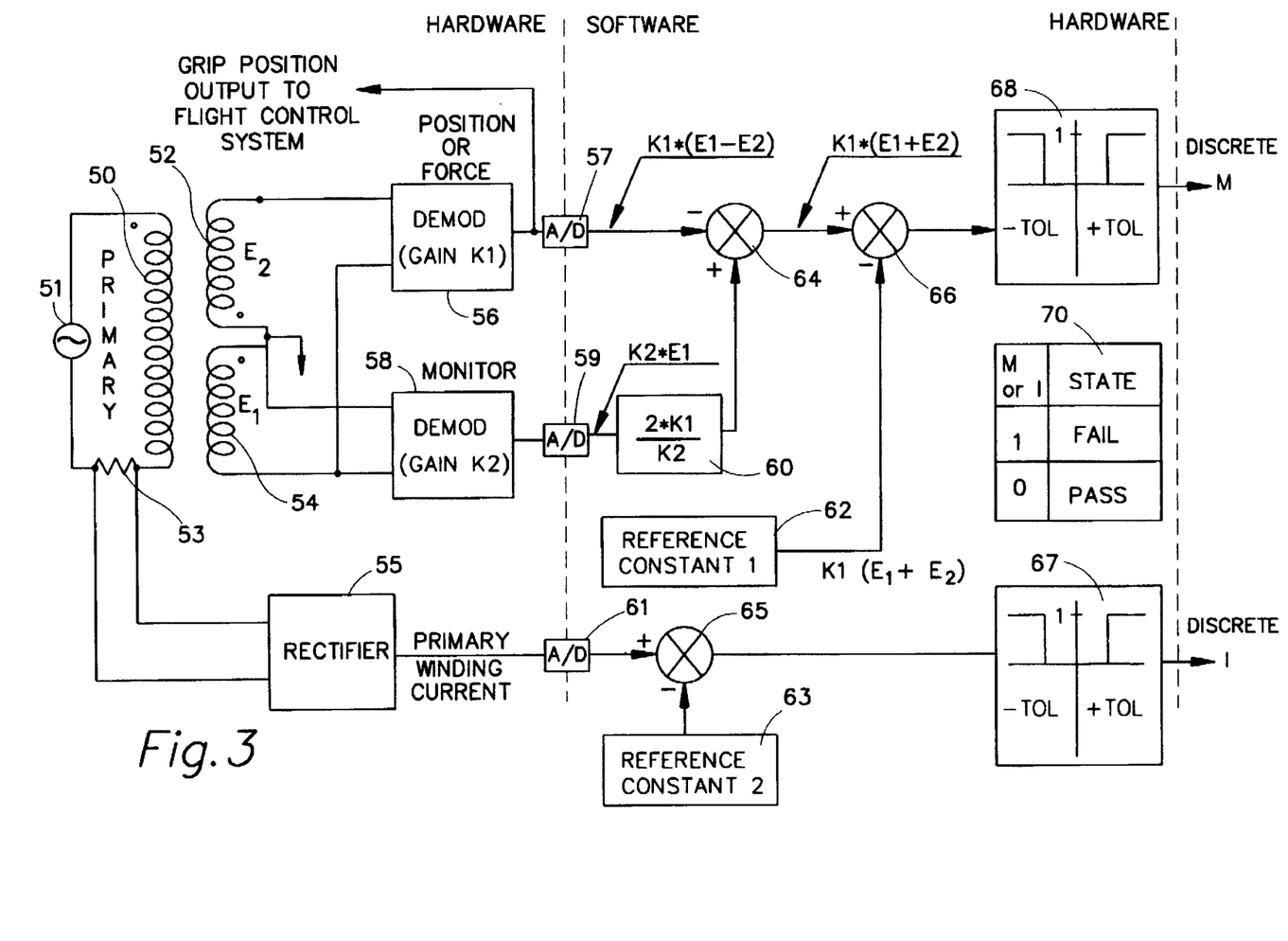
FIG. 3 is a block diagram of self monitoring for position, and torque signals.

The position and torque sensing are based upon an electromagnetic sensor which is electronically represented as a primary winding 50 and two secondary windings 52 and 54 as shown in FIG. 3. More detail on these RVDT sensors is disclosed in U.S. Pat. No. 5,264,768 which is hereby incorporated by reference. The self-monitoring approach for a single RVDT is based upon parallel demodulators 56 and 58 which receive different AC voltages from the RVDT, E1 for demodulator 58 and E1–E2 for demodulator 56. Demodulator 56 with voltage E1–E2 is used for the primary path for the control signal and demodulator 58 with voltage E2 is used as a monitor path for self-monitoring the RVDT and the demodulators. The demodulators have a gain K1 and K2 which result in the signal from the demodulators being K1 (E1–E2) and K2 (E1) via A/Ds 57 and 59. The monitor channel is multiplied by the constant 2 (K1/K2) in block 60 and then the output of demodulator 56 is subtracted from the multiplication in summing function 64 resulting in a signal K1 (E1+E2). For an RVDT the sum of the voltage E1 and E2 is a constant, thereby subtracting a reference constant 62 which is the equivalent to the constant K1 (E1–E2) from the measured K1 (E1–E2) in summing junction 66 should result in the value zero. Hence, in the state detector block 68 a plus and minus tolerance are examined about the zero resulting in an M state of 0 when the built-in-test is passed and a M state of 1 when the built-in-test is failed.

Another built-in-test performed on the position and torque RVDT signals is on the current in the primary winding. The AC excitation 51 on the primary winding drive a current through the primary winding 50 which is sensed by a current sensing resistor 53 and rectified in rectifier 55 to produce a DC voltage via A/D 61 which is compared to reference constant 63 in summing junction 65 resulting in a zero value for passed condition. A discrete I is generated in state detector block 67 similar to the state M.

Figure 4:
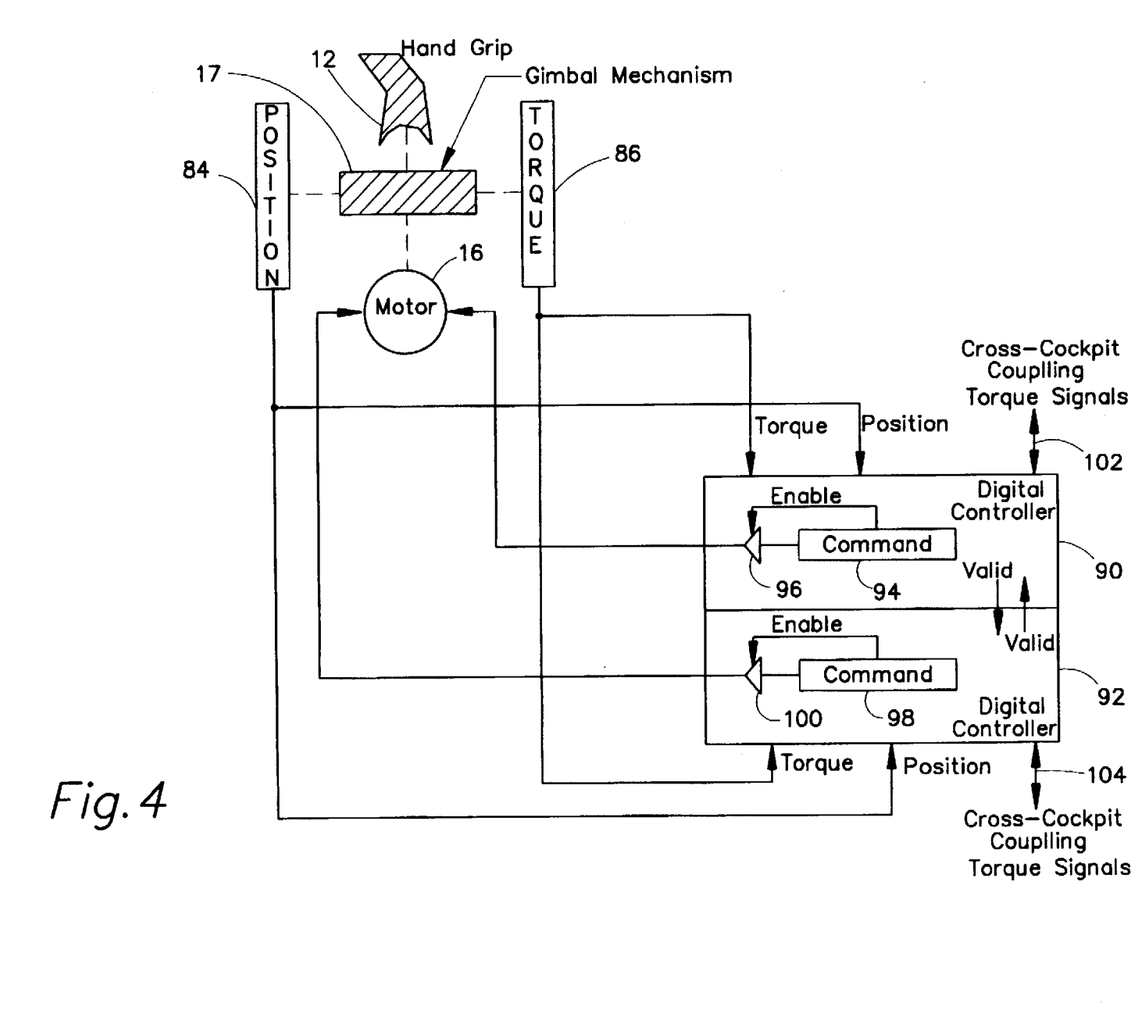
FIG. 4 is a block diagram of the active hand controller system where the electronic functionality is incorporated in a digital controller.

FIG. 4 discloses one embodiment of the non-redundant feel system servo loop shown in FIG. 1. In this embodiment, the torque and position sensors provide output signals indicative of the movements and forces of the hand controller 12. These signals are transmitted to digital controllers 90 and 92. The digital controller 90 includes the command processor 94 and the digital controller 92 includes monitor processor 98. Both the command processor 94 and the monitor processor 98 must enable the motor 16 through amplifiers 96 and 100 respectively for motor 16 to provide force feedback to hand grip 12. The motor then translates these feedback signals and provides the proper feel to the hand grip 12 through the gimbal mechanism 17. The digital controller functions as the feel generator 24, system compensator 22 and the differentiator 20 of the embodiment shown in FIG. 1. The digital controllers 90 and 92 also output cross-cockpit coupling torque signals 102 and 104 respectively.

The digital controllers also provide the functions of the motor controller 18 of FIG. 1 as was disclosed in the motor commutator 34 and the motor rotor position calculation 36 of FIG. 2. The mathematical functions 60, 64, 66, 68, 62, 63, 65, and 67 of FIG. 3 are also performed in the digital controller.

The digital controller 90 and 92 are computer platforms well known in the art with processors, analog to digital convertors, memory and digital to analog convertors. Both digital controllers 90 and 92 receive identical data (position 84, torque 86 and cross-cockpit coupling torque signals 102 and 104) and execute identical software. Hence by comparing results of software calculation between digital controllers 90 and 92 a built in test is performed to verify validity of the data from both digital controllers. The enable signal from either digital controller can disable the motor from generating force feedback. The crosscockpit coupling torque signals are defined in the previously referenced U.S. Pat. No. 5,291,113.

It should be apparent to one skilled in the art that all the built-in test methods and apparatus are only one configuration thereof and that other self monitoring configurations could be utilized to provide such self monitoring, which is commonly known to one skilled in the art.

The non-redundant electronic elements disclosed above in the hand controller system can be combined with a mechanical back-up spring (not shown) such that a failure of the force feedback enable, position, torque or motor built in test will maintain the grip position at null. The mechanical spring implementation is conventional technology which is well known in the art. Combining the mechanical element with the electronics provides that if an electrical failure occurs it can be detected and the electrical system shut down while the mechanical system (e.g., back-up spring) is still operational (reverting to a passive hand controller used in prior fly-by-wire systems). However, losing the electrical elements results in loss of those functions achieved by the electrical system (e.g., cross-cockpit coupling, autopilot backdrivability, variable feel system and flight envelope limiting).

Figure 5:
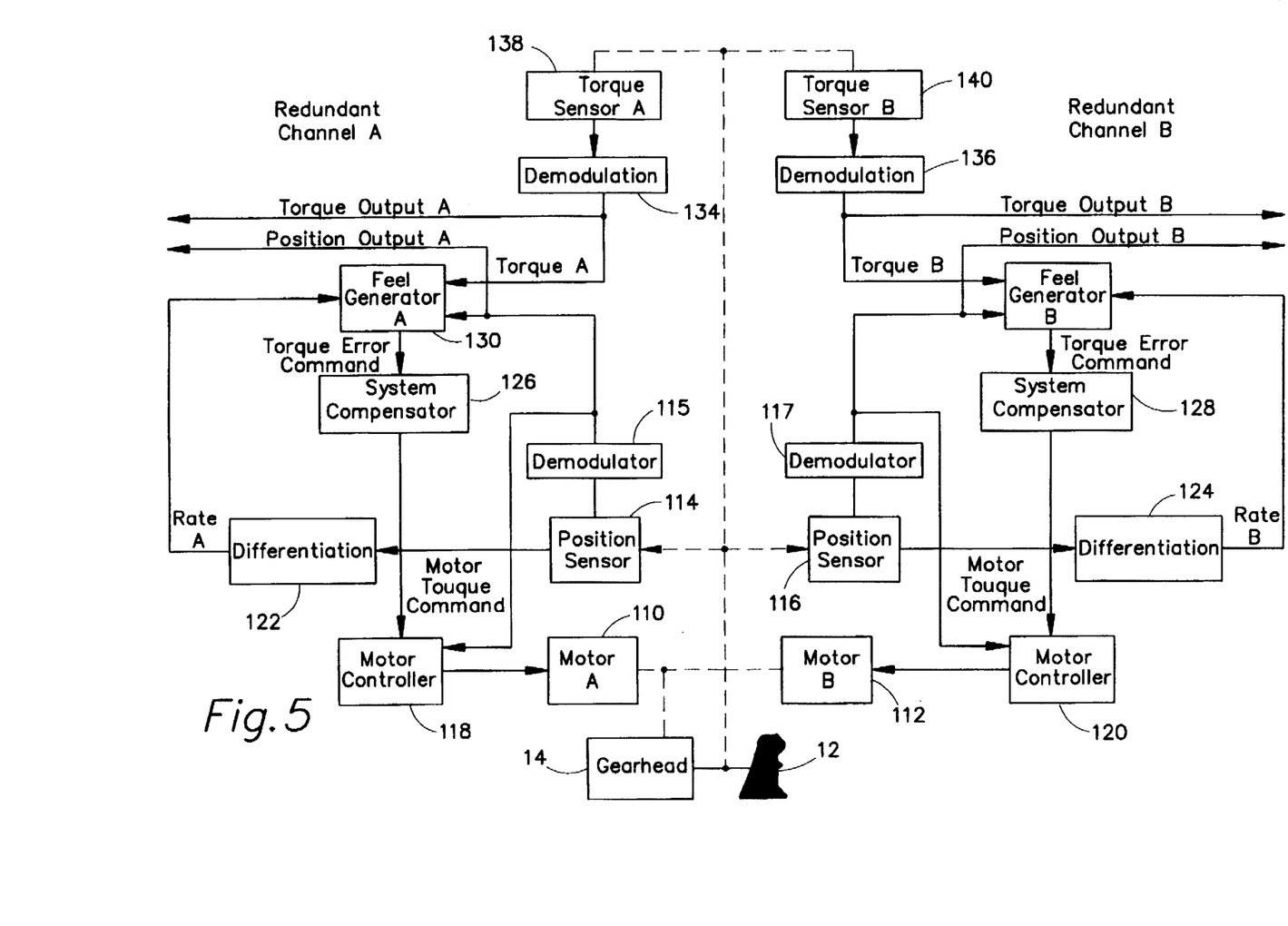
FIG. 5 is a block diagram of the dual redundant active hand controller feel system servo elements.

Shown in FIG. 5 is a second embodiment of the hand controller feel system servo loops. A redundant channel has been added to the embodiment shown in FIG. 1 to provide a hand controller system with redundant channel A and redundant channel B. FIG. 5 shows one hand controller dual redundant feel system servo loop arrangement which employs the self-monitoring failure detection method for each redundancy resulting in a single fail operational and dual fail safe hand controller feel system.

As with the first embodiment of the servo loop, the hand grip 12 is connected to gearhead 14 typically through some form of gimbal arrangement (not shown). Gearhead 14 is physically connected to a common motor shaft to motor A 110 and motor B 112 illustrated in FIG. 5 by a dash line. Torque sensor 138, torque sensor 140, position sensor 114 and position sensor 116 are physically connected to a gimbal arrangement between the grip and gearhead (not shown).

Motor controller 118 accepts a motor torque command from system compensator 126 and a position signal from position sensor 114 and demodulator 115. The motor controller 118 provides a drive signal to motor A 110. The position sensor 114 and demodulator 115 provide a position signal and differentiator 122 provides a rate signal. The torque signal from torque sensor a 138 is provided to demodulator 134 which provides a torque signal output for Channel A. The position signal A is output from the hand controller channel A to the fly-by-wire flight control system. The torque signal A is provided for cross cockpit coupling between the pilot and co-pilot hand-controller for redundant channel A.

Feel generator A 130 accepts a position signal, rate signal and torque signal. Feel generator A provides a torque error command signal to the system compensator 126. The system compensator then transmits a signal to motor controller 118. The position sensor 114 and demodulator 115 output signal is used by the motor controller 118 to commutate the signals to motor A 110. The feel generators determine the feel of hand grip 12 to an operator so that the desired force vs. displacement characteristic of hand controller 12 is felt by the operator.

Referring to redundant Channel B, motor controller 120 accepts a motor torque command from system compensator 128 and a position signal from position sensor 116 and demodulator 117. The motor controller 120 provides a motor command signal to motor B 112. Position sensor B 116 and demodulator 117 provide a position signal and differentiator 124 provide a rate signal. A torque signal is provided from torque sensor B 140 to demodulator 136 which provides the output torque signal for Channel B. A position signal B is output from the hand controller channel B to the fly-by-wire flight control system. The torque signal B is provided for cross cockpit coupling between the pilot and co-pilot hand controller for redundant channel B.

Feel generator B 132 accepts the position signal, the rate signal and the torque signal. Through the system compensator 128, feel generator B provides a torque error command signal to motor controller 120. The feel generators determine the feel of hand controller 12 to operator.

Channel A and Channel B each provide, completely and independently, all control functions necessary to provide the desired torque on the common shaft. In the event that either channel should fail, the remaining channel will continue to provide the desired torque.

It should be pointed out that the self monitoring embodiment disclosed in FIGS. 2 through 4 can be utilized in the redundant channel system disclosed in FIG. 5. For instance the motor controller built in test will be incorporated independently to monitor operation of motor A 110 and motor B 112. The position and torque sensor built in test will monitor independently torque sensor A 138, demodulation 134, position sensor A 114, demodulation 115, torque sensor B 140, demodulation 136 position sensor B 116 and demodulation 117. This will involve two circuits as shown in FIG. 2 for each axis of the hand controller. Further dual sets of digital computers are shown in FIG. 6 maintain independent monitoring of the software function.

Figure 6:
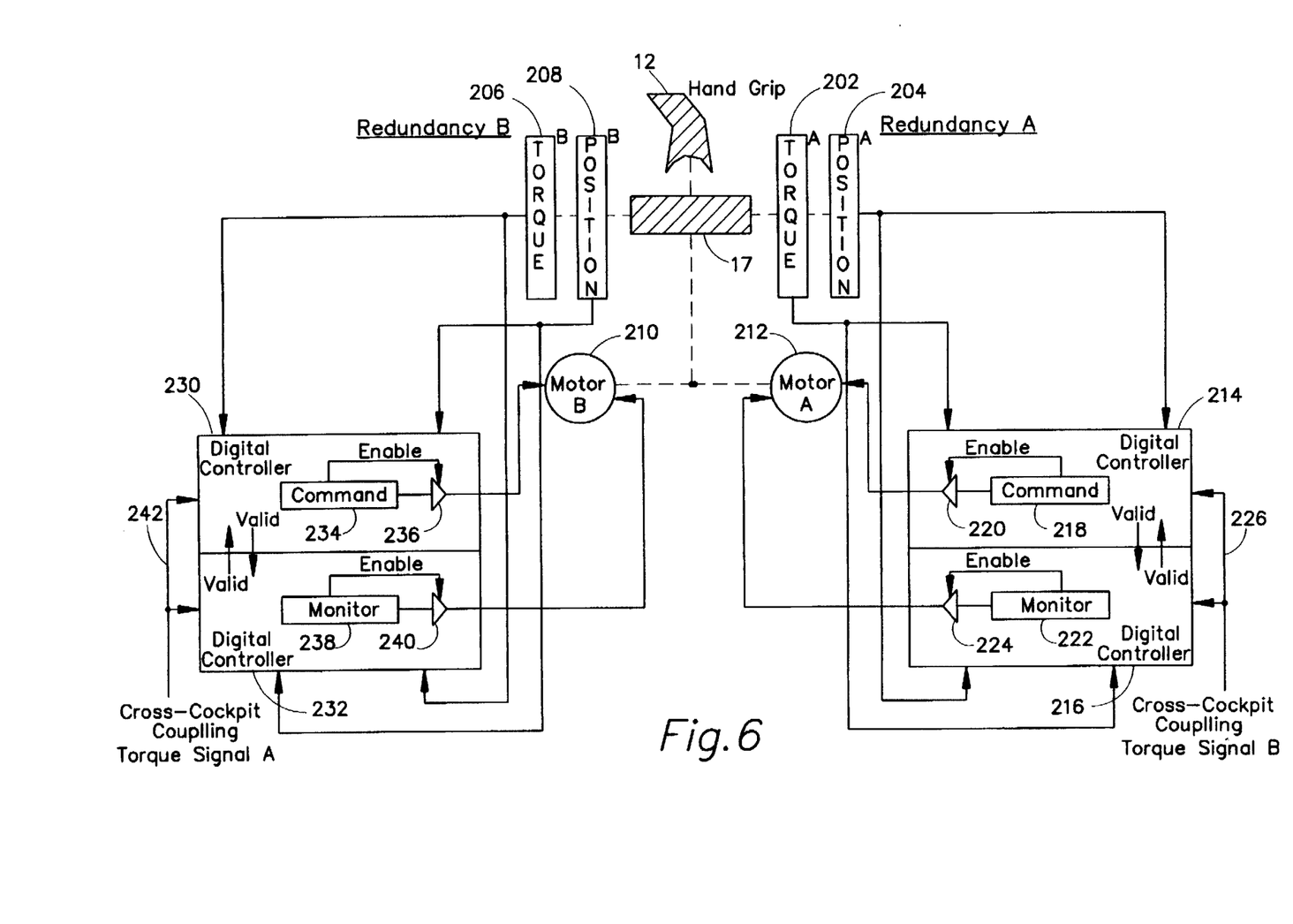
FIG. 6 is a block diagram of a dual redundant active hand controller where the electronic functionality is incorporated in digital controllers.

FIG. 6 discloses a digital embodiment of the non-redundant feel system servo loop with dual channels. In channel A, the torque and position sensors, 202 and 204 respectively, provide output signals indicative of the movements and forces of the hand controller 12. These signals are transmitted to digital controllers 214 and 216. The digital controller 214 includes the command processor 218 and the digital controller 216 includes monitor processor 222. Both the command processor 218 and the monitor processor 222 must enable the motor 212 through amplifiers 220 and 224 respectively for motor 212 to provide force feedback to hand grip 12. The motor then translates these feedback signals and provides the proper feel to the hand grip 12 through the gimbal mechanism 17.

In channel B of the embodiment shown in FIG. 6, the torque and position sensors, 206 and 208, respectively, provide output signals indicative of the movements and forces of the hand controller 12. These signals are transmitted to digital controllers 230 and 232. The digital controller 230 includes the command processor 234 and the digital controller 232 includes monitor processor 238. Both the command processor 234 and the monitor processor 238 must enable the motor 210 through amplifiers 236 and 240, respectively for motor 210 to provide force feedback to hand grip 12. The motor then translates these feedback signals and provides the proper feel to the hand grip 12 through the gimbal mechanism 17.

Channel A and Channel B each provide, completely and independently, all control functions necessary to provide the desired torque on the common shaft. In the event that either channel should fail, the remaining channel will continue to provide the desired torque. Each of the channels includes the self monitoring capabilities described above.

Figure 7:
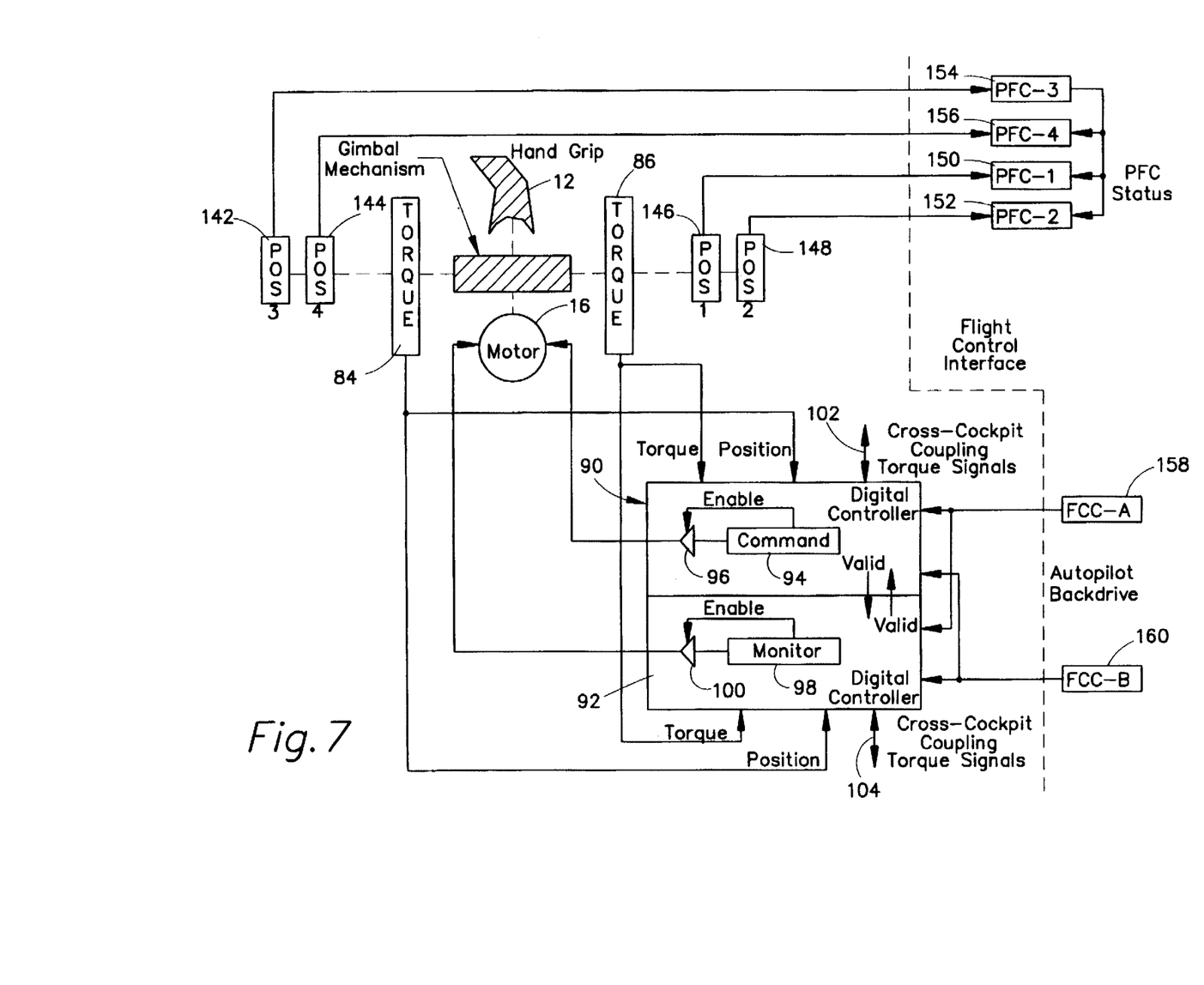
FIG. 7 is a block diagram of the non-redundant active hand controller system integrated with the flight control computers and the primary flight control systems.

Integration of the non-redundant hand-controller feel system into the architecture of an aircraft flight control system is illustrated in FIG. 7. Each hand controller is provided with quad-redundant position sensors, 142, 144, 146, and 148. These redundant sensors provide position signals to the quad-redundant primary flight control computers (PFC) 150–156 for the fly-by-wire flight control system. This connection provides that in the event of failure of the feel system in the hand controllers, the quadruple redundant position sensors internal to the sidestick operate independently on excitation signals provided by the PFC's, allowing the mechanical backup spring to provide grip centering of the position sensors thereby maintaining grip position data to the PFC for safe flight. Each PFC is interconnected to provide for redundant systems monitoring. This implementation can also be achieved with triplex position sensors and provide flight critical date.

Figure 8:
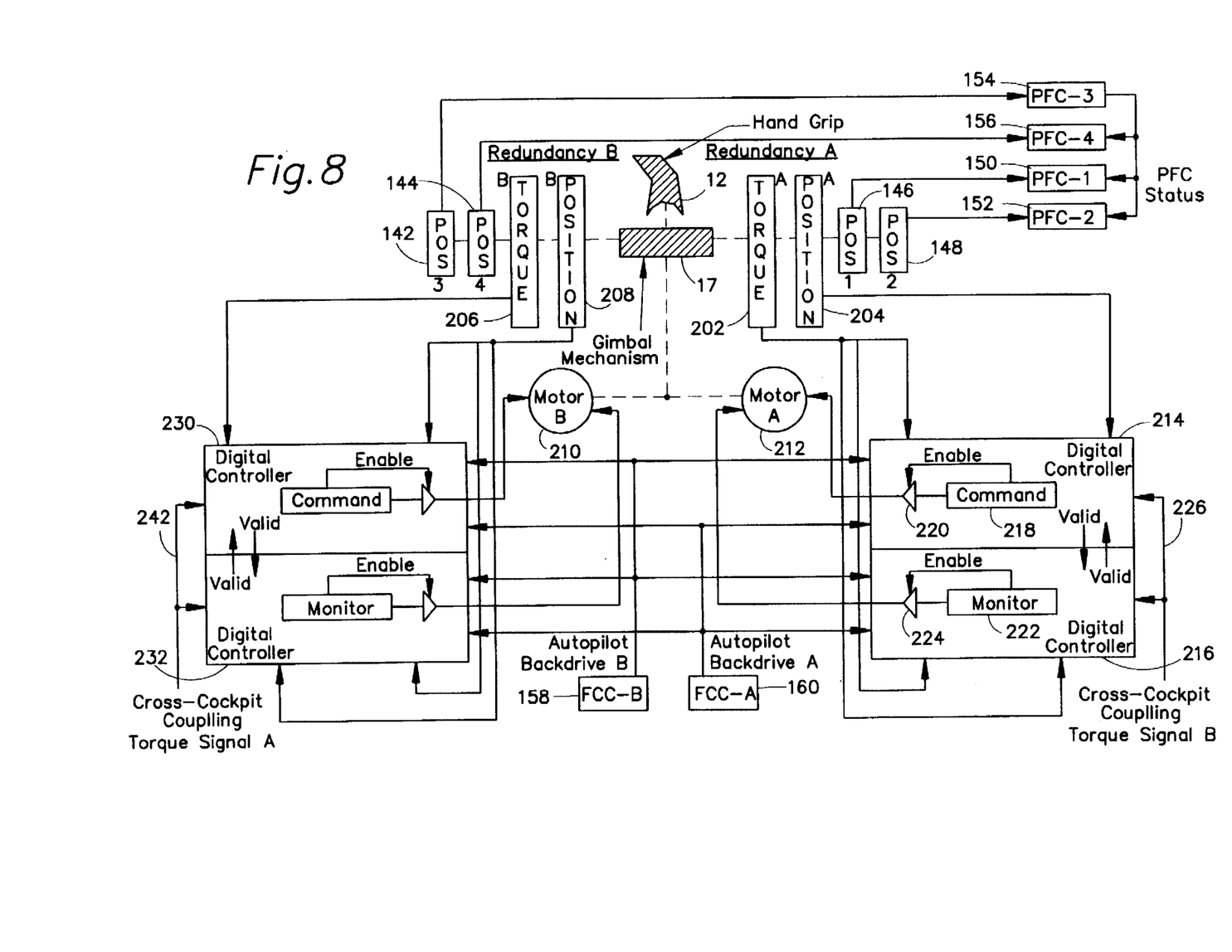
FIG. 8 is a block diagram of the redundant active hand controller system integrated with the flight control computers and the primary flight control system.

As was described above in FIG. 4, digital controllers 90 and 92 each receive the torque and position signals indicative of the movements and forces of the hand controller. The digital controllers transmit the feedback signals to the motor to provide the proper feel for the hand controller. The digital controllers receive autopilot backdrive signals from both flight control computers (FCC) 158 and 160. The backdrive functionality is implemented as dual redundant to provide single fail operation of the back drive function FIG. 8 is a block diagram of the redundant active hand controller system integrated with the flight control computers and the primary flight control system. As with the non-redundant system, each hand controller is provided with quad-redundant position sensors, 142, 144, 146, and 148. These redundant sensors provide position signals to the quad-redundant primary flight control computers (PFC) 150–156 for the fly-by-wire flight control system. The same safeguards provided by the quad-redundant sensors recited above are provided for both channels in this embodiment.

Digital controllers 214, 216, 230, and 232 each receive the torque and position signals indicative of the movements of the hand controller. The digital controllers transmit the feedback signals to the motors to provide the proper feel for the hand controller. The dual channels provide backup in case one channel fails. The digital controllers receive autopilot backdrive signals from both flight control computers (FCC) 158 and 160. The backdrive functionality is implemented as dual redundant to provide single fail operation of the back drive function.

Those skilled in the art will recognize that only preferred embodiments of the present invention have been disclosed herein, that other advantages may be found and realized, and that various modifications may be suggested by those versed in the art. It should be understood that the embodiments shown herein may be altered and modified without departing from the true spirit and scope of the invention as defined in the accompanying claims.

We claim:

1. An active hand controller system comprising:
   a manual controller responsive to a user manual input;
   a first motor in mechanical connection with said manual controller;
   position detecting means for producing a position signal representative of the position of said manual controller respectively connected thereto;
   torque detecting means for generating a torque signal representative of the force exerted on said manual controller respectively connected thereto;
   feel generating means for receiving, said position signal, said torque signal, and generating a motor command signal for said motor to produce a displacement counterforce for a motor command controller respectively connected thereto; and
   means for self monitoring said motor command signal, said position signal, and said torque signal.

2. The active hand controller system of claim 1 wherein the means for self monitoring said motor command signal includes means for comparing the motor command signal to a current signal used to operate the motor.

3. The active hand controller system of claim 1 wherein the means for self monitoring the position and torque signals includes means for comparing voltage signals from a RVDT sensor with a reference voltage signal.

4. The active hand controller system of claim 1 wherein the self monitoring is performed by entering the torque and position signals into both command and monitor computers which are interlinked, the command computer controls the motor in response to the receipt of the position and torque signals and the monitor computer monitors the command computer such that either of the computers can disable the motor.

5. The active hand controller system of claims 1 wherein the hand controller system is backed up with a mechanical backup spring.

6. The active hand controller system of claim 1 wherein the position detecting means, the torque detecting means, the feel generating means, provide signals to a first digital controller including the self monitoring means which provides feedback signals to the first motor.

7. The active hand controller system of claim 6 wherein the position detecting means, the torque detecting means, the feel generating means, provide signals to a second digital controller including the self monitoring means which receives the feedback signals from the first digital controller, and is in electrical contact with the first motor.

8. The active hand controller system of claim 7 wherein quad-redundant position sensors measure movements of the manual controller and provide position signals to a plurality of primary flight control systems.

9. The active hand controller system of claim 8 wherein the first and second digital controllers receive autopilot backdrive signals from first and second flight control computers.

10. The active hand controller system of claim 7 further comprising a third and a fourth digital controller which act as redundant position detecting means, rate detecting means, torque detecting means, feel detecting means, and means for self monitoring for said hand controller, said third and fourth digital controllers provide a second feedback signal to a second motor in mechanical connection with the manual controller.

11. The active hand controller system of claim 10 wherein quad-redundant position sensors measure movements of the manual controller and provide position signals to a plurality of primary flight control systems.

12. The active hand controller system of claim 11 wherein the first, second, third, and fourth digital controllers receive autopilot backdrive signals from first and second flight control computers.

13. An active hand controller system with redundant channels comprising:
   a manual controller responsive to a user manual input;
   a first motor in mechanical connection with said manual controller;
   a second motor in mechanical connection with said manual controller;
   first position detecting means for producing a first position signal representative of the position of said manual controller respectively connected thereto;
   second position detecting means for producing a second position signal representative of the position of said manual controller respectively connected thereto;
   first torque detecting means for generating a first torque signal representative of the force exerted on said manual controller respectively connected thereto;
   second torque detecting means for generating a second torque signal representative of the force exerted on said manual controller respectively connected thereto
   first feel generating means for receiving said first position signal, and said first torque signal, and generating a first motor command signal for said first motor to produce a first displacement counterforce for a first motor controller respectively connected thereto;
   second feel generating means for receiving, said second position signal, and said second torque signal, and generating a second motor command signal for said second motor to produce a second displacement counterforce for a second motor controller respectively connected thereto; and
   means for self monitoring said first and second motor command signals, said first and second position signals, and said first and second torque signals.

14. The active hand controller system of claim 13 wherein the means for self monitoring said first and second motor command signals includes means of comparing the first and second motor command signals to first and second current signals necessary to operate said first and second motors.

15. The active hand controller system of claim 13 wherein the means for self monitoring the first and second position and torque signals includes means for comparing voltage signals from a RVDT sensor with a reference voltage signal.

16. The active hand controller system of claim 13 wherein the self monitoring is performed by entering the first and second torque and position signals into both command and monitor computers which are interlinked, the command computer controls the motors in response to the receipt of the position and torque signals and the monitor computer monitors the command computer such that either the command and monitor computers can disable the motors.

17. The active hand controller system of claims 13 wherein the hand controller system is backed up with a mechanical backup spring.

18. The active hand controller system of claim 13 wherein the first position detecting means, the first torque detecting means, the first feel generating means, and the means for self monitoring are incorporated into a first digital controller which provides feedback signals to the first motor.

19. The active hand controller system of claim 18 wherein the first position detecting means, the first torque detecting means, the first feel generating means, and the means for self monitoring are incorporated into a second digital controller which monitors the feedback signals from the first digital controller, and is in electrical contact with the first motor.

20. The active hand controller system of claim 19 wherein the second position detecting means, the second torque detecting means, the second feel generating means, and the means for self monitoring are incorporated into a third digital controller which provides feedback signals to the second motor.

21. The active hand controller system of claim 20 wherein the second position detecting means, the second torque detecting means, the second feel generating means, and the means for self monitoring are incorporated into a fourth digital controller which monitors the feedback signals from the third digital controller, and is in electrical contact with the second motor.

22. The active hand controller system of claim 21 wherein the first, second, third, and fourth digital controllers receive autopilot backdrive signals from first and second flight control computers.

23. The active hand controller system of claim 20 wherein quad-redundant position sensors measure movements of the manual controller and provide position signals to a plurality of primary flight control systems.

* * * * *